P. CARRIERE
GOVERNORS FOR STEAM-ENGINES.

No. 193,481. Patented July 24, 1877.

Witnesses
Paul Carrière
Inventor

UNITED STATES PATENT OFFICE.

PAUL CARRIÉRE, OF GANGES, FRANCE.

IMPROVEMENT IN GOVERNORS FOR STEAM-ENGINES.

Specification forming part of Letters Patent No. 193,481, dated July 24, 1877; application filed December 30, 1876.

*To all whom it may concern:*

Be it known that I, PAUL CARRIÉRE, of Ganges, France, have invented a new Chronometrical Regulator for Motive-Power; and I do hereby declare the following, when taken in connection with the accompanying drawings and the letters of reference marked thereon, to be a full, clear, and exact description of the same, and which said drawings constitute part of this specification, and represent, in—

Figure 1:
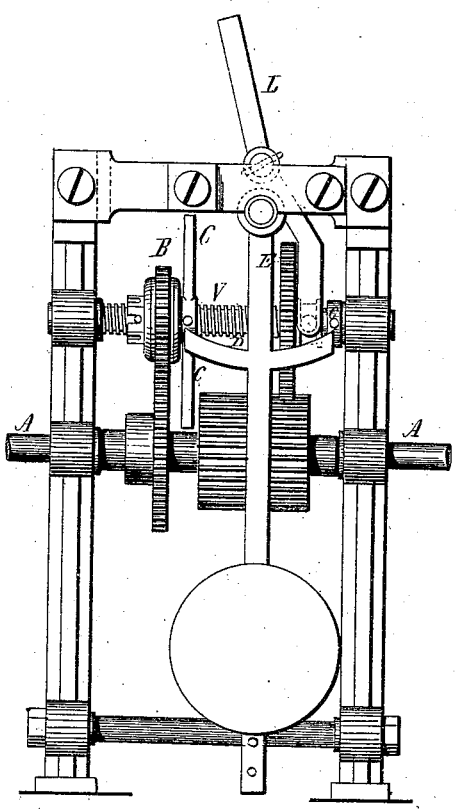
Figure 2:
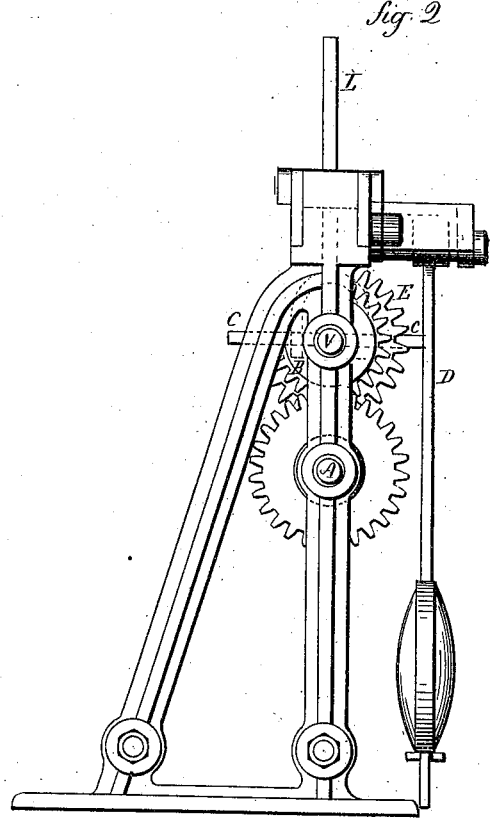

Figure 1, front view; Fig. 2, side view.

This invention relates to an improvement in apparatus for regulating or governing steam or water-power engines, and is based essentially on the application of a pendulum as the organ of isochronism; and the invention consists in the apparatus hereinafter described, and as more particularly recited in the claim.

In this apparatus two movements are taken from, or sustained by, the engine, the one regulated by a pendulum, and consequently perfectly uniform, the other, on the contrary, following exactly the variation in speed of the engine. At the nominal speed these two movements are in equilibrium, and their opposing effects on the valve or other device through which the regulation is produced, reciprocally annul each other, but at the least variation in the speed of the engine the equilibrium is destroyed, and the excess move-movement actuates the valve accordingly until the nominal speed is re-established.

Referring to the drawings, A is the principal shaft, supported in bearings in a framework, and which is caused to revolve by power from the engine, and consequently its speed will vary with the speed of the engine. Parallel to this shaft, and in suitable bearings, is a shaft, U, on which is cut a screw-thread. Attached to the shaft U is a toothed wheel, B, with a corresponding toothed wheel on the shaft A, which causes the wheel B to revolve with the shaft A, and partake of its irregularities, if any. This wheel B is attached to the shaft U by a frictional connection, so that if any resistance be offered to the revolution of the shaft greater than the friction between the shaft and wheel B, the wheel B will revolve without turning the shaft U; otherwise the shaft U will revolve with the wheel B.

On the screw-shaft U is a second toothed wheel, E. This carries a nut corresponding to the screw-thread of the shaft U, so that, one revolving and the other not, the wheel E will be moved longitudinally on the shaft accordingly. This wheel E works in a correspondingly-toothed wheel on the shaft A, the last-named wheel being of considerable length, so as to allow the wheel E to traverse the shaft U to the right or left, and yet be in gear with the shaft A. To the frame in front of the shaft B a pendulum is hung, on the rod of which is an arc, D, extending to the right and left from the pendulum-rod. Rigidly attached to the shaft U, at the right and left, are radial arms C, two at each side, those on one side projecting oppositely to each other, and those on the other projecting in like manner, but at right angles to the first. The relative position of these arms to the arc D of the pendulum is as shown in Fig. 1, so that when the pendulum hangs still and vertical both pairs of arms are within the extent of the arc. Hence when the shaft U revolves the arms C would necessarily strike their respective ends of the arc, and, alternately striking with force, will impart a a vibratory movement to the pendulum, escaping from the end of the arc to continue the revolution, and so long as the rotation of the shaft U is regular the alternate force of the arms C will impart a regular and constant vibration to the pendulum.

A lever, L, is arranged, one arm in connection with the hub of the wheel E, the other arm in connection with the valve of the engine, so that a longitudinal movement of the wheel E on the shaft U will cause a corresponding movement of the valve to open and close, as the case may be.

The operation of the regulator is as follows: The shaft A revolving imparts a like revolution to the wheel B, and also to the wheel E. The friction between the wheel B and its shaft will cause that shaft to turn the pendulum, starting, say to the left, will receive one of the arms C on its arc, which will arrest revolution of the shaft U, the wheel B still revolving; but the friction between the wheel B and shaft U is so great that it will impart a force to the pendulum through the bearing-arms C sufficient to drive it to the opposite side, and allow the bearing-arm to escape, and when free the shaft U will again revolve with the wheel B until the arm C on the opposite side strikes the opposite end of the arc. There again the shaft U will be arrested, and the operation on that end of the arc, the same as the first, will return the pendulum, and, thus continuing, will maintain the constant vibration of the pendulum.

When the shaft U is stationary, or is partially arrested by the arms C striking the arc, as before described, the wheel E will be still revolving, and hence will move slightly on the shaft, in consequence of its screw-connection. To equalize this movement the wheel E is of larger diameter than the wheel B, and their driving-wheels on the shaft A of corresponding diameter; hence a differential movement is imparted to wheels B and E, that of wheel B being considerably faster than that of wheel E; hence when the shaft U is rotated by the wheel B, between the strokes of the arm C, it will be considerably faster than the wheel E, and would therefore tend to draw the wheel E toward the wheel B, while the arrest of the shaft by the contact of the arm C with the pendulum, would move the wheel E in the opposite direction, and this differential movement between the wheels B and E equalizes this longitudinal movement of the wheel E, so as to practically make it constant in its position.

So far the illustration has been with a constant and regular power, and a correspondingly constant and regular vibration of the pendulum.

Suppose, now, that the revolution of the shaft A be suddenly increased. The result will be a more rapid and forcible action of the arm C, and a correspondingly-increased extent of vibration, and also a longer rest of the shaft U, which would cause the wheel E to move farther from the wheel B, turning in the lever L to close the valve and shut off the power, until the power returned to its original or governed condition.

On the contrary, should the speed of the shaft A be diminished, the stroke of the pendulum would diminish accordingly, and the rest of the shaft U be shorter, causing the shaft U to turn a proportionately longer time, and the wheel E to approach the wheel B and operate the valve in the opposite direction, until the equilibrium was again attained.

I do not wish to be understood as broadly claiming a pendulum-regulator, as such I am aware is not new; but What I do claim is—

The combination of the power-shaft A, screw-shaft U, with differential gears B and E, arranged thereon, the first connected by frictional device, the second threaded to correspond to the thread of the shaft and corresponding differential gears on the power-shaft with a vibrating pendulum and arms projecting radially from said shaft U to impart vibration to the pendulum, and with connection from the wheel E to the valve, to be regulated substantially as described.

In testimony whereof I have signed my name to this specification before two subscribing witnesses.

PAUL CARRIÉRE.

Witnesses:
 F. FRIEJEROL,
 COLLIN MAZEL.